Sept. 22, 1964 P. EISLER 3,149,406

METHOD OF MAKING ELECTRICAL HEATING AND CONDUCTING DEVICES

Original Filed Nov. 10, 1958 5 Sheets-Sheet 1

Inventor
Paul Eisler
By
Attys

METHOD OF MAKING ELECTRICAL HEATING AND CONDUCTING DEVICES

Original Filed Nov. 10, 1958 5 Sheets-Sheet 2

Inventor
Paul Eisler
By
[signature]
Atty.

METHOD OF MAKING ELECTRICAL HEATING AND CONDUCTING DEVICES

Original Filed Nov. 10, 1958 5 Sheets-Sheet 3

Inventor
Paul Eisler
By
G. H. [illegible]
Atty.

METHOD OF MAKING ELECTRICAL HEATING AND CONDUCTING DEVICES

Original Filed Nov. 10, 1958 5 Sheets-Sheet 4

Inventor
Paul Eisler
By G. H. Emery
Atty.

Sept. 22, 1964 P. EISLER 3,149,406

METHOD OF MAKING ELECTRICAL HEATING AND CONDUCTING DEVICES

Original Filed Nov. 10, 1958 5 Sheets-Sheet 5

Inventor
Paul Eisler
By [signature]
Atty.

United States Patent Office 3,149,406
Patented Sept. 22, 1964

3,149,406

METHOD OF MAKING ELECTRICAL HEATING AND CONDUCTING DEVICES

Paul Eisler, 57 Exeter Road, London NW. 2, England

Original application Nov. 10, 1958, Ser. No. 783,633, now Patent No. 3,020,378, dated Feb. 6, 1962. Divided and this application Dec. 29, 1958, Ser. No. 789,221
Claims priority, application Great Britain, Nov. 18, 1957, 35,912/57
8 Claims. (Cl. 29—155.5)

Figures 1, 2, 3, 4:
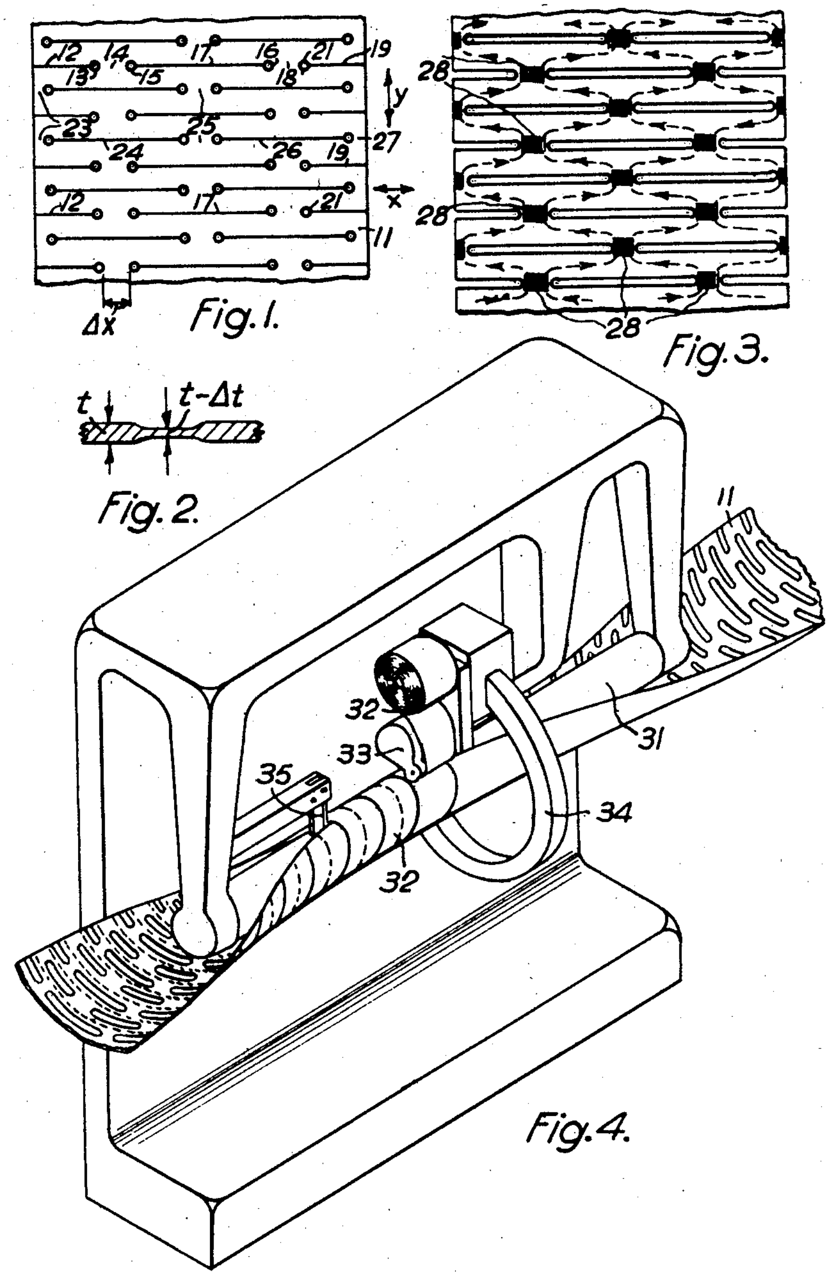

The following is a divisional specification of United States application Serial No. 783,633 filed November 10, 1958, now Patent No. 3,020,378.

The present invention relates to electrically conductive surface patterns incorporating substantially straight arms of metal foil, for instance electric heating films comprising a meander pattern of metal foil, and to methods of producing them. Various heating films comprising metal foil patterns have been described in the past and the method known as the printed circuit technique such as outlined in U.S.A. Patent No. 2,587,568 and British Patent No. 639,178 is suitable for producing them. In my co-pending applications Nos. 747,314 filed July 8, 1958, now Patent No. 2,971,073, 747,315 filed July 8, 1958, now Patent 3,033,970, 752,384 filed July 31, 1958, now Patent No. 3,089,017 and 749,554 filed July 18, 1958, now Patent 3,100,711 an account has been given of heating films for use in space heating and food heating most of which are fed with current from a low voltage supply and are designed to warm up quickly but not get very hot, that is not reach a temperature dangerous to cheap plastic films or papers supporting the metal pattern. Desirably aluminium foil is used for the metallic pattern of these films. Their application as a covering for walls, ceilings and floors, in heating tapes, or as in dispensible packagings for food and food heating devices, etc., has been described in the above applications.

Aluminium- and other metal foil patterns made according to the present invention are intended to be used in the same way, either laminated to paper or plastic film or enclosed within such materials or—and this is an additional possibility presented by the present pattern—without these insulating films covering the whole or parts of the pattern area.

While these so-called low temperature heating films are a major application of the present invention, it is not restricted to it; the foil pattern produced by the invention may also be used as the heating element in higher temperature devices such as in electric toasters and ovens, process heaters and radiators. Another use to which the heaters according to the invention can be applied is the heating of aerodrome runways to disperse ice or fog. They enable selected areas to be heated almost instantaneously and also enable a heated area to progress along the runway. The invention includes the construction of new types of heater which permit not only the temperature but also the radiating area of the heating element to be varied, a spot heater to be changed to an area space heater, and the construction of heating devices on the lines of Venetian blinds.

The invention almost completely eliminates the waste of foil material in production, permits narrow foils to be used to cover wider areas and imparts to the foil pattern the ability to be stretched and compressed, thus making it almost like an elastic fabric. One of the most important advantages is the ease, convenience and reduced cost of manufacturing the heating film according to the invention. The same applies to other structures for instance so called tape cables incorporating elastic conductive foil patterns with substantially parallel lines.

A structure according to the present invention incorporates a metal foil presenting an electrically conducting pattern having a plurality of substantially parallel arms, at least two terminal areas adapted for connection into an electric circuit, and a flexible insulating support for said pattern, the foil being deformed transverse to its mean surface without substantial deformation of that surface as a whole so that the pattern can yield at least across the length direction of the arms without substantial variations in total thickness. It is a preferred characteristic that if the deformation of the foil were removed, the foil would substantially close the spaces between the greater part of the length of the spaced arms in other words the pattern is one which can be produced without waste. It will be made clear later there may be small rounded apertures at the ends of the spaces between the arms but they are of negligible length compared with the length in which the space would be closed and therefore represent negligible waste. A preferred way of giving the foil its elasticity is to crimp at least a part of it and if the insulating support is of a material such as paper which has substantially no inherent elasticity or which has insufficient elasticity it may also be crimped. The elasticity of the support may be increased by openings distributed over it, for instance simple cuts or holes or slots and the pattern of openings may match the spaces between arms of the foil. The nature of the foil pattern and support may be such that one will definitely tear before the other in the case of excessive tensile load. Structures in which the pattern is so yielding that the support tears first are generally better for low voltage applications because in these it often does not matter if the foil is exposed, and those in which the support and pattern are both elastic but have their elasticities so related that the foil tears first are generally better for high voltage application, because there the circuit will be broken before the foil is exposed.

A structure within the scope of the invention is one in which the insulating support extends into as well as across the space between arms of the pattern substantially filling the total thickness of the pattern. Thus at least the upper layer of the insulating support may be of a plastic or adhesive material which by pressure can be forced into cuts in the foil. This operation helps to produce the deformations of the foil by forcing the plastic or adhesive into the cuts where it remains. It would also be possible to introduce a solid insulating thread into the material so squeezed into the cuts, for instance a glass fibre which will not be affected by the working temperature. The structure may be used as a tape cable of high current carrying capacity.

To enable the temperature and the rate of radiation of electric heaters according to the invention to be varied they may be folded concertina fashion, and be provided with means for adjusting the relative disposition of the folds, preferably by the aid of stiffeners located between successive folds adjacent to the fold lines.

Heating foils according to the invention may be combined with acoustically absorbent fabric, the openings in the pattern being arranged in front of the absorbent fabric. The combined material can then be used for walls or ceilings and the whole combined structure can be made sufficiently light and adaptable to be used as a detachable lining to be suspended from an existing ceiling.

The method according to the present invention of making an electric heating fabric by forming a meander pattern of electrically conducting foil includes the steps of making a sequence of spaced (generally parallel) sets of cuts extending each in a line, with the bridges of uncut foil between cuts in one line staggered relatively to those of adjacent lines, deforming areas of uncut foil to change the mean surface dimensions of the foil in a direction having a component perpendicular to the lines of cuts and in a sense such as to cause the cuts to open into slots and providing at least two terminal areas adapted to connect the pattern between points of different potential in an electric circuit.

The foil may be plain and the deformations may then be produced by indenting uncut foil areas constituting bridges between cuts heavy enough to cause plastic flow, when these areas of foil will expand in their own plane and by choosing the position and form of the areas of indentation, the cuts can be caused to open. Another possibility is to force the cuts open by squeezing part of an insulating layer for an instance adhesive or plastic film beneath the foil into the cuts where it remains. Instead or in addition crimping may be employed and the foil itself may be a plain foil or a crimped foil and in the latter case the deformation can be wholly or in part a complete or partial flattening of the crimps. Or by crimping the arms after the cuts have been made the foil can be caused to contract and so open the cuts into slots. Both expansions and contraction transverse to the length of the cuts, produced in these ways can be used in combination.

By squeezing uncut foil areas constituting the bridges between the cuts in a non-uniform manner, for example by squeezing an array of pimples into each such area, the arms of the pattern can be caused to swing through an angle and open the cuts into substantially lozenge form, and the squeezing action can be supplemented by crimping the foil in appropriate directions. The pattern is then made up of two sets of substantially parallel arms crossing at an oblique angle with lozenge shaped openings between the arms.

The foil pattern made by the present invention is similar to certain patterns of expanded metal but without having whole branches of the foil distorted out of their original plane as is essential to the production of expanded metal even when it is subsequently rolled to flatten it. The present invention directly expands or contracts the foil in its own plane.

It should here be emphasized that the methods used in the production of expanded metal cannot be applied to foil because of the tenuousness and lack of rigidity of foil. Though it may be said that there is no strict dividing line between foil and sheet, it may be said that foil is a material of not greater thickness than say 0.006 inch (0.15 mm.) and in practising the present invention it will usually be thinner than this. It is here convenient to mention that in referring to the plane of the foil the mean surface is meant, this applying particularly to crimped foil. Also the term plane does not imply that the foil is worked on or used in the flat. On the contrary it will usually be worked on while passing over rollers, and in use may be rolled, folded or otherwise bent.

A particular advantage of the present invention is that it can be carried out with continuously running high speed machinery using foil drawn from the roll, the deformations being effected by passing the foil between contoured surfaces running continuously in a closed path and exerting sufficient stresses on the foil. Thus the contoured surfaces may be on endless bands pressed by rollers or they may be on the rollers themselves. Existing machinery used in laminating foil to flexible insulating material such as paper or plastic film can be adapted for the purpose merely by the addition of extra rollers and the speed of the machine need not be reduced. In so far as the method involves an increase in length of the foil after expansion this merely requires a change in speed of subsequent rollers and since the patterned foil has some elasticity in this direction, there is some tolerance in the relative speeds of the rollers which have to rotate at different speeds.

It will be understood that in this specification the term "squeezing" is used to cover a variety of localised operations on the foil which produce changes in the mean surface of the foil without substantial displacement of the mean surface. If the squeezing is in the nature of an indentation the foil will expand in its own plane. Such an indentation can be on one or both sides and it thins the foil. Such thinning of the foil can however be accompanied by a certain amount of embossing that is to say the indentation will make the foil concave on one side and convex on the other but still with the thickness reduced. Squeezing is also possible however in such a way as to thicken the foil thus causing it to contract in its own plane and there may simultaneously be some degree of embossing so that the foil is convex on one side and concave or flat on the other. Another form of squeezing is in the nature of a local embossing which does not change thickness of the foil but causes it to contract in its mean plane. These different actions can be used as may be most convenient for getting the desired result and one type of squeezing action can be used at one position and another at another. The term "pimples" used herein is intended to cover a small localised squeezing action. It will be seen that crimping is a species of embossing without change of thickness to cause contraction in the mean surface and this is a preferred way of obtaining contraction, while indentation without embossing but in such a way as to thin the foil is a preferred way of getting expansion.

Figures 5, 6, 7, 8, 9, 10:
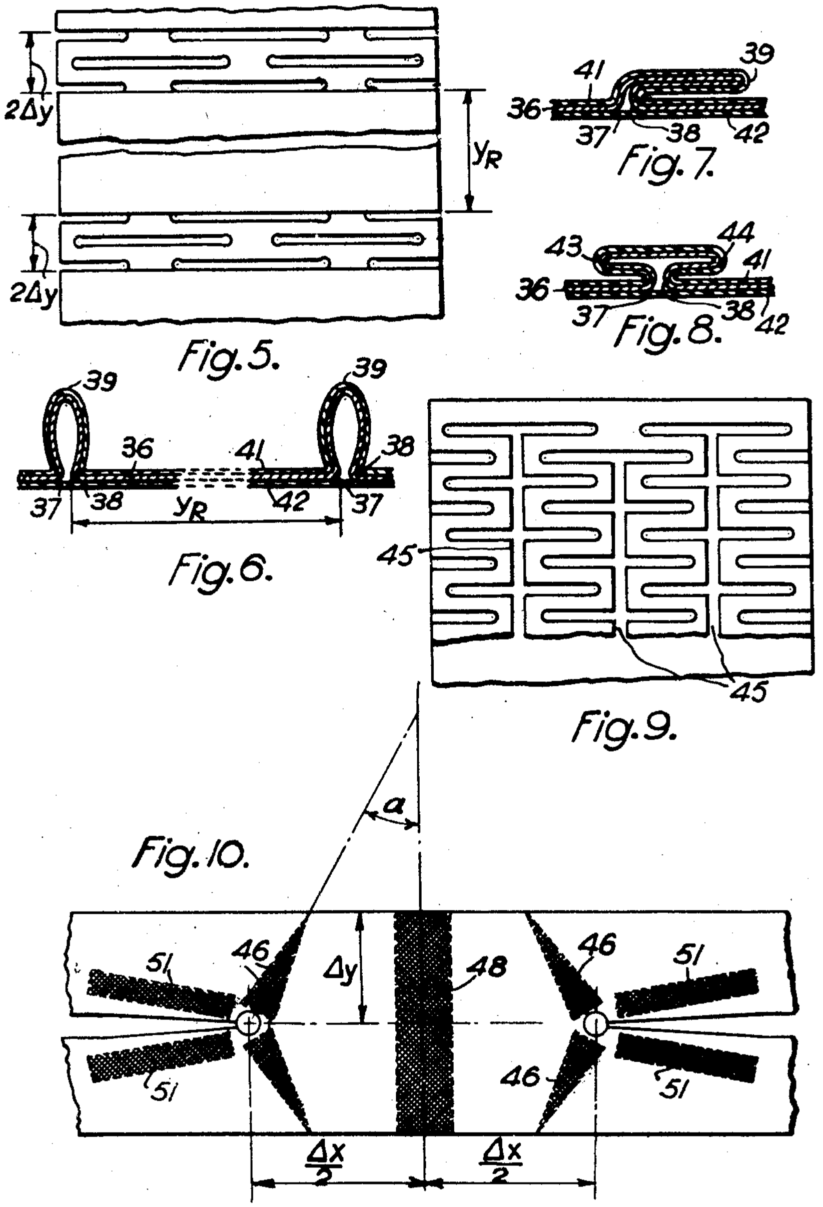
Figure 11:
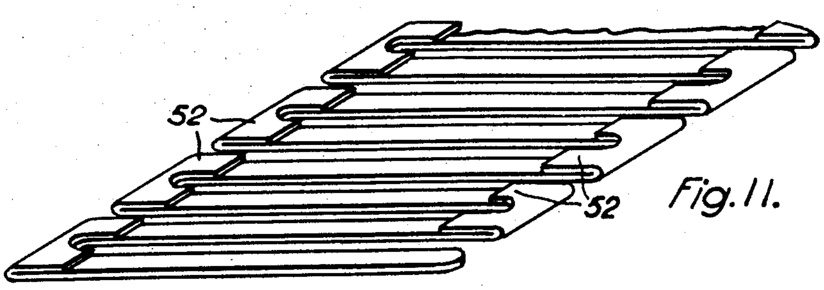
Figure 12:
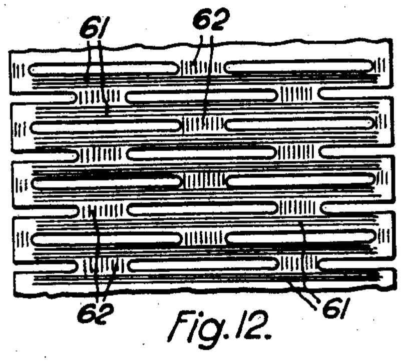
Figure 13:
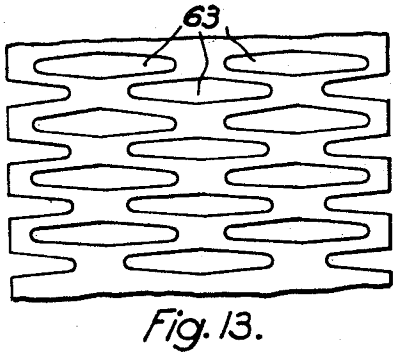
Figure 15:
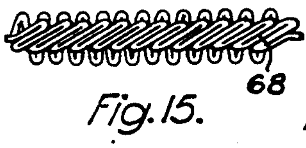
Figure 14:
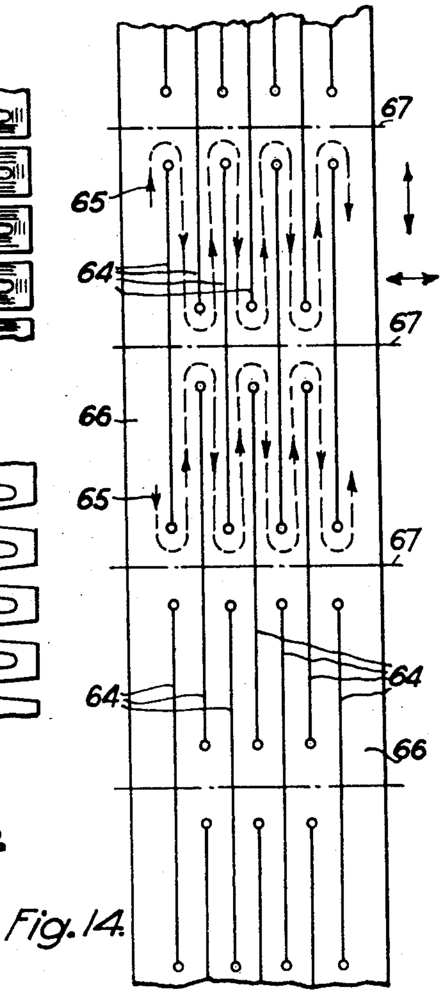
Figure 16:
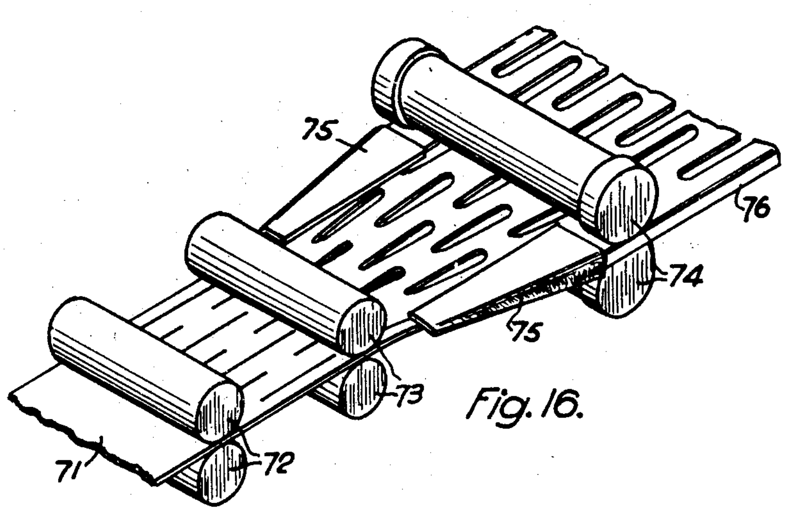
Figure 17:
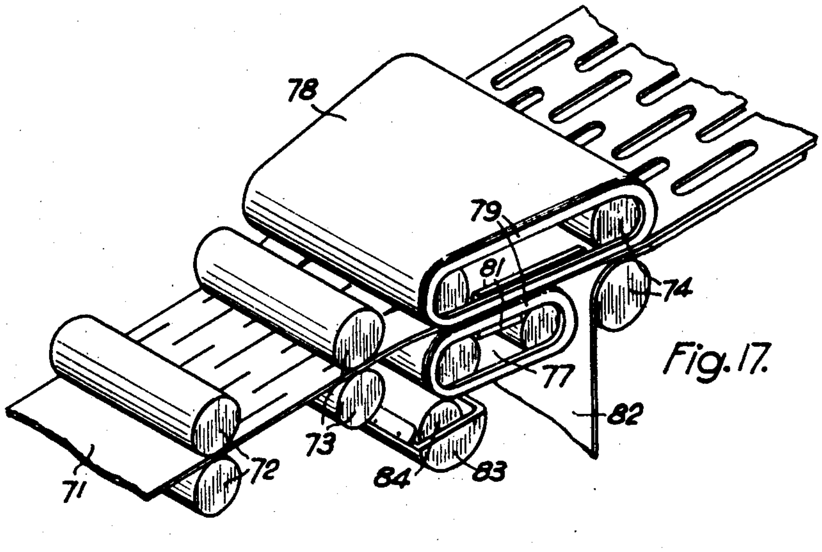
Figure 18:
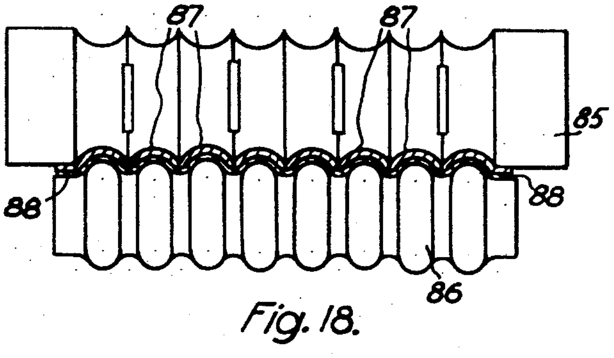
Figure 19:
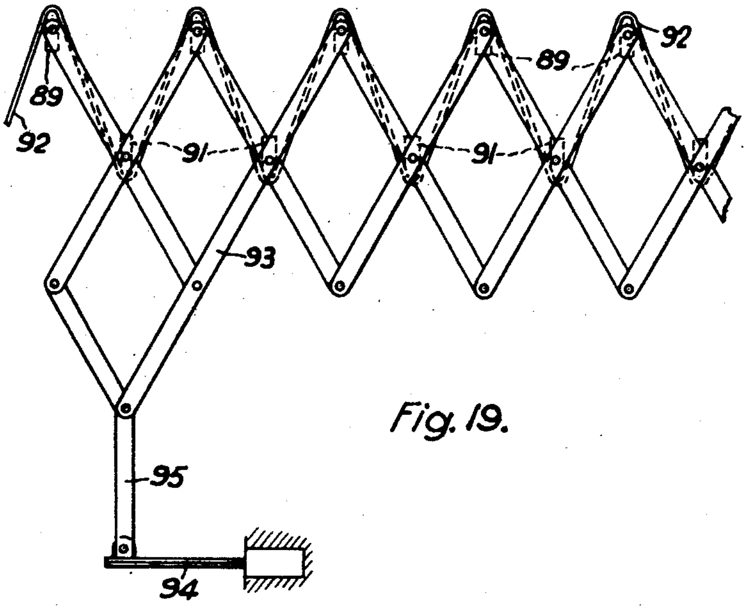

The invention will be further described with reference to the accompanying diagrammatic drawings in which FIGURE 1 shows a scheme of cuts made in a foil according to one embodiment of the present invention, FIGURE 2 is a cross section on the line II—II of FIGURE 3 on an enlarged scale, FIGURE 3 is a similar view to FIGURE 1 but showing the pattern obtained after the squeezing of selected areas of the foil of FIGURE 1, FIGURE 4 is a diagrammatic perspective view illustrating the sewing of a relatively narrow insulating tape to the foil pattern, FIGURE 5 illustrates part of a pattern arrangement for severing at regular intervals to provide lengths with the terminal areas accessible, FIGURES 6, 7 and 8 illustrate developments of FIGURE 5, in which the terminal areas are folded during the production of the insulated pattern in continuous lengths, FIGURE 9 illustrates the slotting of a pattern such as that in FIGURE 3 to separate the several meander paths, FIGURE 10 is a detail on an enlarged scale illustrating a method of expanding the foil of FIGURE 1 into a pattern having lozenge shaped openings, FIGURE 11 shows modifications of FIGURE 3 in which the resistance in the neighbourhood of the junctions of the arms is reduced, FIGURE 12 illustrates another method of producing a pattern on the lines of FIGURE 3 from that of FIGURE 1, FIGURE 13 shows a modification of FIGURE 12, FIGURE 14 shows a scheme of cuts made in a foil according to another embodiment of the present invention, FIGURE 15 is an edge view of an embodiment having busbars along the longitudinal edges of reduced resistance, FIGURES 16, 17 and 18 illustrate three methods of opening the cuts of the pattern of FIGURE 14 into slots, and FIGURE 19 illustrates a configuration of the pattern which enables its temperature to be varied under constant electric load.

In order to describe the foil pattern and its manufacture the following scheme is adopted:

A system of co-ordinates is fixed referring to the original mean surface of the foil which for convenience is assumed plane:

$x$ is the direction of the foil width in the foil plane,
$y$ is the direction of the foil length in the foil plane,
$z$ is the direction perpendicular to the $xy$ plane and the following symbols are used:

$t$—original foil thickness,
$\Delta t$—amount by which $t$ is reduced,
$\Delta x$—distance between ends of cuts along a line of cuts in the $x$ direction
(Foil not severed over a distance $\Delta x$)
$\Delta y$—distance in $y$ direction between successive parallel lines of cuts in the $x$ direction.

The above designations refer to wide foil, that is foil of sufficient original width to give the desired width of pattern. (Later the principle of a major variation of the pattern will be described and it will be explained how the invention deals with foils too narrow for the direct production of the desired pattern.) In the following several examples of the method of producing the foil pattern are given, assuming that the foil is sufficiently wide.

The foil pattern can consist of one meander path only, but there are generally several parallel meander paths, the meander arms extending in the $x$ direction and the whole pattern proceeding in the $y$ direction, ideally for the whole length of foil to be patterned. So far as the production of the pattern is concerned, there is no limit to the length $y$. The foil may be drawn from a roll as large as the foil manufacturer can supply. In the following example a pattern with several, say four, meander paths is made.

As shown in FIGURE 1 an array of straight line cuts, all parallel and in the $x$ direction is made in the foil 11. In the first line there are three cuts; the first 12 starts at the left hand edge and has a small rounded end 13, then, proceeding along the line follows a bridge 14 of length $\Delta x$ at which the foil is not cut, then between two rounded ends 15, 16 there is a cut 17 twice as long as the first 12, then a bridge 18 of length $\Delta x$ again and again a cut 19 starting with a rounded end 21 and reaching to the right hand foil edge. The third cut 19 is of the same length as the first 12. The rounded ends may be cut out or burst in.

The second line of cuts starts at the left hand foil edge with half a bridge 23 of length $$\frac{\Delta x}{2}$$

then follows a cut 24 of the same length as the centre cut 17 of the first line, then a full bridge 25 of length $\Delta x$, then another long cut 26 of the same length as before and finally a half bridge 27 of length $$\left(\frac{\Delta x}{2}\right)$$

at the right hand foil edge. Both ends of both cuts are rounded.

All odd numbered lines of cuts show the same sequence as the first and have the same references, all even numbered the same as the second line and have the same references. In this example $\Delta y$, the distance between lines of cuts, is equal and constant over the whole pattern.

Simultaneously with or subsequently to the cutting operation, the bridges 14, 18, 25 and half bridges 23, 27 are heavily squeezed along the corresponding line of cuts. The radius of the tool or roller exercising this "line" squeeze, and the temperature and pressure used are such that the bridge are permanently indented for example as shown in FIGURE 2. The foil thickness at the bridge goes down by $\Delta t$ and the cuts in the line open into narrow slots without any removal of metal from the foil. The resulting pattern is shown in FIGURE 3. The rounded ends of the cuts make for a rounding of the slot ends and prevent any tearing from starting there.

If, as in this example, it is desired that all four meander paths indicated by the arrows in FIGURE 3 should have the same cross section in the centre of the bridges as in the arms, the indentation has to be effected so as to achieve a value of $\Delta t$ satisfying the following equation:

$$\Delta y \cdot t = \frac{\Delta x}{2}(t - \Delta t)$$

Whence $$\Delta t = \frac{t}{\Delta x}(\Delta x - 2\Delta y)$$

Note that for $\Delta t$ to be positive i.e. a reduction in thickness, $\Delta x$ must be $>2\Delta y$ for this type of pattern.

The opening of the cuts into slots not only separates neighbouring meander arms and expands the pattern, but also helps in bonding or fixing the pattern to an insulator, in folding it on the lines of cuts and fixing stiffeners at these regions.

It will be clear that the pattern based on lines consisting of two half length cuts 12, 19 and one full length cut 17 alternating with lines consisting of two full length cuts 24, 26 resulting in four paths is only an example and that smaller and larger numbers of cuts resulting in two paths or in a greater number of paths than four can be produced in a similar manner.

The actual dimensions of the pattern, in particular the length and width of the arms will depend on the thickness and material of the foil, the voltage of the supply and the heat dissipation per unit area required. In general it is desirable to keep the width of the arms as small as manufacturing conditions will conveniently permit and it will in general be preferable to use a pattern presenting more parallel paths with narrow arms rather than fewer parallel paths with wider arms. It will only rarely be required to exceed an arm width of ¼ inch (6 mm.).

This pattern with the meander arms in the $x$ direction i.e. across the foil is particularly suitable for use in wide heating tapes such as might be used for heating pads under carpet runners, for curtain linings, for heating jackets, for wall hangings, and for similar applications, especially when working on a low voltage supply. With the arms running in this direction the pattern has greater ability to stretch than if the arms run in the $y$ direction. It is also more easily arranged so that it must be disconnected from the supply if it is to be or can be brought into a form e.g. rolled or folded up, in which it should not remain connected. Consideration of the arrows in FIGURE 3 will show that the terminals of the several paths are necessarily at the ends of the length of foil incorporated in the tape. In consequence the supply terminals must be separated by the length of the tape and are to be so fixed or retained that the tape cannot be manipulated by being rolled up, folded or similarly bent whilst still connected. Desirably the supply is effected by connections on opposite sides and the connectors may be of clip form equal in length to the width of the tape so that the tape must lie flat in order to be connected. The tape may be provided with transverse stiffeners or with stiffeners at the two longitudinal sides for ease of handling or rolling up, the important advantage of this provision being that even a corner cannot be folded over when the tape is in use and excessive heating due to a restriction of its heat dissipating surface can be reliably prevented.

For the purposes above described the pattern may be sewn to one or in between two textile tapes. This may be done either directly or after the pattern has been laminated to one or between two plastic films. The lamination may be effected by heat sealing or by using self-adhesive plastic films or by the operation of "corrugation sealing" that is to say by making small, closely spaced sharp indentations which drive the foil into the film and cause the foil and film to become interlocked. The foil may be actually perforated or merely covered with minute pimples or corrugations in this process.

The sewing of the pattern to one textile or other insulating tape or the sewing together of two such tapes enclosing the pattern can be done in a variety of ways, preferably by a multi-needle sewing machine. The seams may run either along and between the meander arms across the tape width or they may run in the length direction, the stitches being placed in the gaps between the meander arms. In both cases it is preferable for those needles which pass over bridges of the pattern to be held up out of action while over the bridge areas.

If the stitching is in lines across the width of the tape this can hardly be effected with a conventional multi-needle machine. Or it may not be convenient to provide an insulating tape as wide as the pattern. In these cases the slotted foil pattern (or several patterns side by side metallically bonded to one another or not) may be bent progressively into a hollow substantially tubular formation for instance around a cylindrical support 31 FIGURE 4 with the edges closer together than they were in the flat (usually nearly abutted, just abutted or even overlapped) and securing the flexible insulating tape 32 wound helically around the bent slotted foil with the edges of the tape closely adjacent, thus forming a laminated tube. In the example shown in FIGURE 4 this securing is done by a stitching head 33 which carries a supply of the tape and rotates around the support 31 being guided on a track 34, in relation to which it is radially adjustable to suit the diameter of the laminated tube which is formed as the materials pass the head 33. This tube is fed longitudinally along the support 31 and as it leaves it is severed at 35 along a line adjacent the edges of the pattern, enabling the whole to be opened out into a flat band in which the tape 32 which was helically wound is disposed in the form of a succession of cross pieces which by regulating the pitch of the helix can be made to lie edge to edge, overlapped or spaced apart. If the pattern edges nearly abut or just abut, the severing line lies between them, if they overlap it will generally be arranged to lie midway so that each margin after severing has a firmly held extra layer of foil which may be advantageous for some purposes such as increasing the current and heat generation along the meander paths adjacent to the margins.

According to the purpose in view the stitching may pass through the slots of the foil pattern and an underlying textile tape which would be of the same width as the foil pattern, or the stitches may simply pass into a plastic insulating film to which the foil is secured by one of the methods above mentioned or by more than one of such methods used simultaneously, or the tape pattern may be stitched to the helically wound tape.

Instead of stitching, the helically wound tape 32 may be secured by adhesion. Thus it may be self-adhesive in which case the head 33 will only need to comprise a guide and roller for the tape, or it may be heat sealed in which case a heater for the roller may be provided.

For use as heating film in "Wallpapers," dispensable food heating devices, etc., the expanded pattern is laminated to a paper or plastic film or between two such flexible insulators. "Corrugation sealing," sticking by means of an adhesive or by heatsealing are the three possible fixing methods which may be used alternatively or in combination (generally of two).

"Corrugation sealing" also gives a certain degree of elasticity to the metal foil in the $xy$ plane and it is preferred to use it together with either heat or adhesive bonding. It can be carried out like all the previous operations of cutting, squeezing and expanding while the foil is passing between rollers in various stages of a laminating machine. In the same laminating or "converting" machine a cover film or paper is usually laminated over the pattern or a coat of varnish is applied so that the pattern is generally enclosed between two layers of insulation.

An overall coat or cover, however, has to be removed over the area of terminals which in the example shown in FIGURE 5 are two areas of the whole pattern width of a length of $\Delta y$. The two areas are at such $y_R$ distance as, having regard to the other dimensions of the pattern and the nature of the foil, the desired resistance of the parallel meander paths between them requires.

In order to prevent these areas from being covered with an insulating layer, be it a coating, a film or a paper, the top cover can be applied in cut lengths $y_R$ or, if a coat, applied over delimited lengths $y_R$ with a gap of $2\Delta y$ length always left bare; a coat can be applied while the terminal areas are masked; it can be stencilled, printed, etc.

This arrangement is illustrated in FIGURE 5. By severing the material along the centre lines of the bare areas a corresponding terminal area is left on each end of each severed length. These centre lines should coincide with a line of cuts. These methods of leaving bare areas, however, have limitations and according to a further development of the present invention illustrated in FIGURES 6, 7 and 8 it is preferable to arrange for the heating film to be folded prior to the application of the top cover, to form a system of folds at intervals of $y_R$. Such a system includes at least two folds on lines of cuts at a separation of $2\Delta y$ i.e. with the folds between the arms of the pattern so that a U or V formation is produced with a line of cuts at the centre as well as at each of the junctions of the formation with the general run of the foil. These two junctions are brought together and thus shorten the foil in the $y$ direction by $2\Delta y$ at every interval of $y_R$. If the foil is between two insulating films, one is folded with the foil while the other can be continuous without folds and this cover foil goes directly from one junction to the next. Such folding and the application of the cover film without folds can be carried out in a converting machine and the resulting structure is shown diagrammatically with the thickness exaggerated in FIGURE 6 where the foil pattern is marked 36, while 37, 38 are the folds on lines of cuts at a separation of $2\Delta y$ and 39 is the fold at the apex. The folded insulating film is marked 41 and the continuous, unfolded cover film 42. If now the structure is severed through the film 42 between the folds 37, 38 and through the foil 36 and film 41 at the fold 39 an effective length of pattern of $y_R$ is obtained, held between two insulating layers plus a bare accessible terminal area of $\Delta y$ length at each end which can be folded back against the main length.

For many purposes projecting U or V formations as in FIGURE 6 are inconvenient. They can be folded down flat as in FIGURE 7 when the unsevered material is for instance reeled up in which case as compared with two folds 37, 38 at 90° to the length as in FIGURE 6 the fold 37 more or less disappears temporarily while the fold 38 is increased to substantially 180°. Then when the material is to be severed it may first be brought back to the form of FIGURE 6. Alternatively extra folds 43, 44 may be formed at substantially 180° as in FIGURE 8 in which case the folds 37, 38 are also increased to substantially 180° while the fold 39 substantially disappears. In this form the material can be severed without disturbing the folds and the half width terminal areas between the folds 43, 44 and the fold 39 respectively can be folded back onto the rest of the material so that the folds 43, 44 disappear.

The example chosen as a first illustration of the invention has four parallel meander paths as pointed out with reference to FIGURE 3. The resistance of a length $y_R$ is consequently 1/4 of the resistance of each single meander or 1/16 of the resistance obtained if the four paths are connected in series. These higher resistance values may be obtained by making slots to interrupt the bridges while leaving the separate meander paths intact after laminating the foil pattern to the insulating base film. Such slots are shown at 45 in FIGURE 9. When such a foil pattern is used without insulating support or envelope the slots should be bridged by insulating buttons, clamps or seals, to give the pattern adequate mechanical cohesion. According to the temperature range of operation of the pattern the "button" or clamp may consist of pairs of ceramic or synthetic resin or other plastic wedges or bars, of cement, or of adhesive tape.

Such cutting away of bridges can also be employed to obtain other variations in the pattern and to isolate different paths from one another.

When only a straight single meander path is required over a relatively narrow width or a few parallel meander paths, it is often advantageous to make a pattern not with a few pathways like the example shown in FIGURE 3 which has four, but with many pathways and cut the whole film finally along lines in the $y$ direction. In some uses of heating films in food packs, for instance in case of a heating film in a packet of potato crisps, it is possible to use the bare, unlaminated foil pattern for the major part of the film and for instance form it into a loop. Between the superposed ends of the loop there will be an insulator such as paper or plastic film to permit both ends to be gripped by the current supply terminals.

For other heating film applications such as food packs or metal vessels where at least part of the heating film or its terminals, has to be secured to a metal surface over an insulating interlayer, a sheet of such insulation, continuous or in label form which bonds to the foil by an adhesive or by a high temperature sealing coat but has a sealing surface on its back which seals at a lower temperature will facilitate what would otherwise be an awkward handling and manufacturing problem. The interlayer can be applied to the foil pattern by a laminating or labelling machine at high speed.

In the examples given so far only a modest expansion of the foil pattern in the $y$ direction has taken place caused essentially by squeezing or indenting the bridges at the cutting line. The roller effecting the indent has its axis in the $x$ direction and seen from the $z$ axis the indents made in the foil are of narrow rectangular shape as at 23 in FIGURE 3. The long sides of the rectangle are almost $\Delta x$ long and lie in the $x$ direction symmetrically disposed to the line of cuts.

In the next example the expansion of the foil pattern in the $y$ direction is very substantial. This is preferably effected by first subjecting the cut foil to a progressive patterned local indentation or squeezing and—in a further example—is assisted by a co-ordinated pattern of local crimping. This local action progresses along the whole foil so that the whole area of the foil surface is progressively depressed and/or folded (or left alone) in a predetermined sequence. Preferably the indenting and crimping is done by rollers, simultaneously or subsequently with the cutting of the foil, also carried out by rollers, in the same pass through the converting machine.

The indentations or pimples may be round or oblong, straight line or odd shaped. The desired local squeeze may be obtained by selective grouping of pimples over the area and taking account of their number, size, depth and shape (long axis of pimple at right angles to squeeze direction). The local squeeze is usually designed to stretch the particular part of the already cut pattern into a desired new direction, not just to make it longer. In some cases the squeezing pattern aims at both, change of direction of the meander arms and the lengthening and/or widening of the bridges in the $x$ direction. In yet other cases the electrical resistance in the arms or bridges is varied locally by squeezing as will be described later.

The foil pattern comes locally out of its plane during processing but is ultimately flat and no pattern of local crimping is needed. The pattern is stretched in the $y$ direction only and the average foil thickness is reduced.

A simple example of a pattern of pimples is shown in FIGURE 10. This consists of two substantially triangular areas of pimples at 46 at each end of each cut such as 24, 26 the individual pimples being deepest and the width of the areas 46 being greatest at the rounded end of the cut and the general direction being away from the cut but at an angle $a$ less than $$\arctan\frac{2\Delta y}{\Delta x}$$

to the $y$ direction so that the areas do not reach the intersections A of the centre lines of the bridges with the cuts in the adjacent lines of cuts and thus does not introduce undesirable stresses in the foil in the mid part of the bridges. The pimples by thinning the foil cause it to extend in its own plane and thus the pattern of pimples will cause each meander arm to swing through a small angle which opens the cuts into lozenge shaped openings. At the same time it also lengthens each arm slightly thus partially compensating for the reduction in total width of pattern due to the angling of the arms. This can be supplemented by widening the bridges in the $x$ direction by means of continuous depressions along their centre lines in the $y$ direction of the bridges as at 48. This depression may be effected by a rib on the roller. The pattern of pimples will generally be produced by means of engraved rollers, or for small runs, by interleaving hard foils carrying the pimple pattern in relief.

The system of indentations additional to such as are used to produce the necessary expansion of the cuts into slots may be employed for another purpose altogether. When a meander pattern as above described and having a form such as that shown in FIGURE 3 for example is in use the current tends to concentrate along the diagonal lines extending from the end of one slot to the end of the next slot that is diagonally across the arms. Due to this concentration heat tends to be concentrated along these lines and particularly at the junctions of the arms that is in the region of the ends of the slots that divide the arms. Even though the total heat dissipation may be of the desired value this concentration leads to hot spots at the junctions of the arms. To reduce the concentration of current along these diagonal lines reduction of the section of the foil may be made along them by indentation. This reduction of the section of the material increases the resistance along these lines so that the current concentration is reduced. In FIGURE 10 for example such indentations are indicated at 51.

Another way of avoiding hot spots at the ends of the slots which separate the arms is to reduce the foil resistance where approaching the bridges along lines around but a little away from the ends of the slots. This can be done by folding over the pattern so that the effective thickness of the foil at the junction of the arms of the meander pattern is thickened. Such folds are indicated at 52 in FIGURE 11. The folding can be applied to any pattern and can be executed as double folds after the fashion of FIGURE 8 but with the folding lines corresponding to 37, 38 spaced apart. Folding is simplest when there is only a single meander.

In the examples just described the deformation of the cut foil pattern was carried out by an organisation of local squeezing or indenting actions. No co-ordinated local folding actions, referred to as "crimping" were employed. However such co-ordination is a preferred method of the present invention. It consists in imparting to cut foil not only indentations but also a number of small folds of the character for which the term crimps is suitable. The number, size, depth and direction of these crimps is selectively arranged for each local area of the foil and is planned so that it can be progressively carried out, preferably by the rollers of the converting machine in the same pass as cutting and indenting. Crimping without simultaneous dimpling contracts the foil in a direction at right angles to the folds and at the same time takes the foil out of its original plane though leaving it with the mean surface substantially undisturbed. This helps very much in avoiding dangerous stressing of the foil when dimpling is effected and when the meander arms are being stretched. The preferred pattern of crimping covers bridges and meander arms, and makes the pattern narrower in the $x$ direction and of shorter expansion in the $y$ direction than without crimps. Crimping gives to the foil an artificial thickness several times as great as the actual foil thickness. The most important feature, however, is the elasticity it conveys; it renders the foil pattern stretchable like an elastic fabric. This is very desirable for heating films in space and body heating ("wallpaper," heated scrolls, curtains, tapes, bandages, blankets, etc.), various dispensable food heating films and all sorts of heating fabrics. Even where the stresses arising from the heating cycle are small in view of the small temperature differences used, handling stresses can be considerable.

FIGURE 12 shows diagrammatically a similar pattern to that of FIGURE 3 produced by crimping alone. Here the arms of the meander pattern have crimps indicated by the lines 61 running lengthwise so that the arms have narrowed, thus opening the cuts into slots while the bridges have the crimps 62 running in the longitudinal direction of the foil so that they have been narrowed in the transverse or *x* direction. However by changing the direction of the crimps or varying their depth the arms can be caused to swing through an angle thus producing lozenge shaped openings 63 as shown in FIGURE 13. As a result the pattern consists of two sets of substantially parallel arms crossing at an oblique angle.

The expansion of the pattern in the *y* direction by opening the parallel meander arms of the cut foil at an angle can be done by crimping alone without dimpling, just as it can be done by dimpling alone without crimping. Having described the latter, the former needs no further detailing, particularly as it has been stated already that neither is preferred alone. Combined dimpling and crimping is the preferred method.

Before going further, attention is here called to the following variation of the basic pattern. So far all lines of cuts run in the *x* direction that is the widthwise of the foil. In several important cases which include the production of standard stock material of "infinite" length, however, the invention provides for the lines of cuts 64 to run in the *y* direction along the foil length as in FIGURE 14. Foil patterns cut this way would expand in the *x* direction and contain numerous parallel meander pathways such as those indicated by the arrows 65, between the two edges of the foil which form the busbars 66 of all these parallel resistors. If in the description given above with reference to FIGURES 1 to 3 the necessary transformations are made in the statements and equations relating to the length, spacing and so forth of the cuts the description will apply to the present type of pattern and need not therefore be repeated here. The description of FIGURES 9 to 13 also applies with corresponding modifications while FIGURE 4 applies only for the adhesive tape embodiment. In the present pattern with the cuts running in the *y* direction, the cuts will usually be made much longer than when they run in the *x* direction as in FIGURE 1. Similarly as described with reference to FIGURE 8 the bridges can be slotted or cut away to separate the different meander patterns or modify them or even to convert the structure into what amounts to a tape cable with a number of parallel conductors which may at considerable intervals have connections between them. Such connections can be cut away when necessary.

There are two cases in which the *y* cuts proposed by the present invention bring major advantages. The first case is with narrow foils which have to cover a wider area. This need often arises when foils have to be used which are only rolled in narrow width. Most higher resistance alloy foils and high melting point metal foils belong to this group. They can be used economically in surface heaters (radiators, oven wall, toasters, etc.) of an area which in both directions exceeds the foil width by making the cuts in the *y* direction and expanding the foil pattern in the *x* direction. If the meander paths produced in parallel paths need to be rearranged so as to be connected in series by slotting the bridges as above mentioned, the slots will be in the *x* direction.

The other case for which the *y* cuts of the present invention bring a major advantage is that of heating films of considerable length or reels of such heating films of long or "infinite" length which are to be supplied for use as wall covering, as "heated wallpaper," heating tape, bandage, food heating film, immersion heating film, etc. For these films the lateral edges of the foil are used as busbars and/or terminals and are usually left wider than the width of the meander arms as indicated in FIGURE 14.

Where the exposure of a busbar of sufficient width is objectionable, for instance because of the loss of heated area or in heating tapes, the foil edge can be folded over several times or it can be reinforced by joining another thicker and/or better conducting metal foil strip on to it over its whole length or over a part of it. In heating tapes this helps considerably in effecting connections.

A single meander path between the busbars 66 in FIGURE 14 defines the resistor unit of the film. All the units are in parallel and the film can be cut at the *x* centre line 67 of each bridge. If the film is cut at any other line only the area between the cut and the next bridge will be "dead," the remainder will be heated at the predetermined wattage per unit area. This freedom to cut off any length to fit any size of surface to be heated is a very important feature which renders it possible to produce stock material in great or "infinite" length defined by width and resistance value per unit area for use as heating wall paper, furnishing and clothing fabric, packaging, tape, etc. The busbars are crimped in the *x* direction and correlate with the foil contraction in the *y* direction. In many applications the crimps in the busbars 66 may be laid over or partially flattened as shown at 68 in FIGURE 15. This will decrease the resistance and therefore the voltage drop along the busbar without entirely destroying the elasticity of the heating film in the *y* direction.

The expansion of the metal foil with the pattern of cuts into a meander pattern can be effected by slight tension in a direction at right angles to the lines of cuts irrespective of whether the foil is crimped or smooth. With smooth foil a strain and distortion occurs near and at the bridges, but this is in many cases not prohibitive.

It will be clear that in a pattern as in FIGURES 1 to 3 with the cuts in the *x* direction and expansion in the *y* direction, the expansion as well as the various other operations on the foil can be effected while it is running over the rollers of the converting machine.

When the pattern has the cuts in the *y* direction as in FIGURE 14, the expansion is in the *x* direction i.e. transverse to the length of the foil. Various methods can be employed for the expansion which can be used in conjunction with a converting or laminating machine without the speed being substantially reduced. As shown in FIGURE 16 the foil 71 after being given the pattern of cuts and the necessary deformation (here shown as effected by two successive pairs of rollers 72, 73 though in some cases it will be possible to effect both operations by a single pair of rollers while in others it may be convenient or necessary to use more than two pairs) is led to another pair of feed rollers 74 shaped or arranged to grip only the margins (busbars 66, FIGURE 14). If the foil is initially stretched transversely and straightened at the margins, before being fed into the nip of the rollers 74, in principle the rollers will continue to pull the margins in as initially set and therefore at their initial spacing and the desired transverse extension will be obtained. The foil can be unsupported between the rollers, say in a loop, or it can slide over a stationary support or rest on a conveyor band. The control so exerted on the foil may however not be adequate to ensure constant expansion and it may be supplemented therefore by bending over part of the margins on each side, as by a guide 75 and the rollers 74 be made of such length that these bent-over edges 76 just engage the ends of the lower roller after being separated transversely and re-straightened. There may also be another guide on the underside for the bent-over edge leading from the rollers 73 to the rollers 74. The bend may be the first step in folding over the margin as described above, or the bend may be taken out of the foil after passing the rollers 74. In the former case an insulating film may be laminated to the foil by the rollers 74 or this may in any case be done by a later pair of rollers.

A developement of this method of expanding the foil is illustrated by FIGURE 17. Here, on its way from the rollers 73 to the rollers 74 it passes between two endless bands 77, 78 of india rubber or other elastomer which can be stretched the required amount transversely. These bands may be stretched by the aid of edge ribs 79 which pass over guides 81 and the ends of the rollers over which they pass at their wide ends; in some cases it may be possible to dispense with guides 81. The bands frictionally engage the foil and thus expand it transversely. It may be convenient to make one band, say the band 77, shorter than the other and use the corresponding roller 74 to lead in an insulating film 82 which is thereby laminated to the foil at the termination of the expansion. The band 77 may coat the foil with an adhesive for this purpose supplied to the band from a trough 83 by a roller 84. This has the extra advantage that the lateral stretching of the band helps to spread the adhesive while the adhesive serves also as a lubricant between the band and the foil which reduces local stresses in the foil.

It may in some cases be possible to dispense altogether with one of the elastic bands. A further possibility is to divide each band into a number of narrow tapes in which case, so long as they are flexible, little elasticity is required.

Another possibility on a different principle is illustrated by FIGURE 18. Here a roller 85 which deforms (or both cuts and deforms so avoiding difficulties of registration) or which succeeds the deforming roller, has a grooved or corrugated profile which by coacting with a resilient counter-roller 86 substantially displaces the foil 87 to produce the necessary expansion. The overall length of the roller is no more than the original width of the foil but the actual lateral length of its surface is increased by its profile. At the same time an insulating film 88 of the width of the exanded pattern is fed between the foil 87 and the counter roller 86 and laminated thereby to the foil. The profile of the roller 85 is preferably such as to avoid deforming the film 88 beyond its elastic recovery. Another insulating film could also be fed between the foil and the roller 85 and also be laminated to the foil. When the laminated structure leaves the rollers 85, 86 it is returned to the flat form by the elasticity of the film aided if necessary or desirable by a further pair of plain cylindrical rollers.

These methods do not exhaust the possibilities of expanding the foil transversely and are only illustrative examples. Other possibilities include paraboloidal and similar barrel profiled rollers and indeed almost any means which could be used to stretch a rubber band transversely could be used since the properties of the foil pattern in this respect are sufficiently similar to those of rubber.

If a structure comprising a foil pattern with the cuts in the *y* direction is to be sewn to one or in between two textile or other insulating tapes by a multi-needle sewing machine it is usually not necessary to prevent the needles piercing those bridges of the foil pattern which stretch across the seams, if the bridges are of liberal length in the "*y*" direction and/or if the foil is crimped with crimping lines in the "*x*" direction.

The foil pattern of all examples given so far has been made with meander pathways of fairly constant cross section; if the heating film is kept flat it dissipates heat evenly and uniformly from all of its unit areas. This is the general and preferred case.

However, it is possible and sometimes desirable to deviate from this uniform distribution of heat generation over the whole pattern area. The films, may for instance, be wrapped around adjacent pipes or places on groups of (curved) radiators arranged to radiate some part of their heat emission towards some of the surfaces of other radiators of the group. A heating film of uniform heat generation by virtue of its ohmic loss being uniform all over its surface would lead to local overheating in the above cases. On the other hand, it may be required for other reasons to produce different temperatures at different, predetermined areas of the film as for example in food heating films where some parts of a food package, for instance by reason of the thickness or consistency of the foodstuff may require less heat than others.

In all these cases and in many others the production of a foil pattern of a non-uniform but predetermined and controllable heat dissipation is required. The invention provides for this requirement by the following measures which can be taken singly or in any desired combination:

*a*. The pattern of cuts can be varied. $\Delta x$ can be slightly varied, $\Delta y$ can be very liberally varied.

*b*. The depth of the indentation and amount of squeezing effected as well as the pattern of dimples and crimps can be varied.

*c*. The expansion of the foil pattern can be altered, particularly where the pattern is crimped, owing to its great elasticity.

While *a* and *b* are for the manufacturer's attention *c* is a means of control which the user of the film may employ without the need for any tools. This possibility of changing the density of active pattern elements over an area by locally varying the amount of expansion or contraction of the foil pattern while keeping the pattern flat is a valuable advantage of the invention.

There is, on the other hand, a class of applications in which the invention offers variability by folding, particularly folding in concertina fashion, so that the pattern is no longer substantially flat but has a sizeable *z* dimension. Usually the folding lines are on original lines of cuts, but the folding lines can also run at right angles to the lines of cuts through the centres of the bridges. As long as the meander pathways are left connected in parallel, the bridges at each line of cuts are at the same potential. They can therefore be put between metal bars or clamps, or have metallic stiffeners, rods, tubes, bars, plates, etc. fixed on the inside of the fold. If the plates, strips or bars are relatively wide they will be set with their narrow edges towards the folding line. These stiffeners permit the concertina movement to be actuated by mechanical links, for instance links provided just beyond the edge of the pattern. Closing the concertina decreases the projection of the pattern on to the *xy* plane and gives it a substantial *z* dimension. The greater this *z* dimension the more the folded pattern areas ($\Delta y$) radiate towards each other and the less to the outside. The pattern therefore gets the hotter the more the concertina is closed.

The folds at successive folding lines are to the opposite hand. When the concertina is closed the stiffeners in the even folds will be opposite those in the odd folds, and for convenience one set of folds may be regarded as in the front and the other in the rear. Control can be exercised by movement of the stiffeners primarily in either the *y* or the *z* direction, or both directions. Front and rear stiffeners can be moved independently, uniformly or differently over different regions or in a determined time sequence. An example consists in arranging the stiffeners to form a kind of Venetian blind which opens and closes from one end. The differentiation over different regions in the *y* direction may be effected not only in order to regulate the density but also the angular direction of radiation which can be varied to some extent by the rear folds being moved away from the centres between the front folds and thus out of the symmetrical position.

The concertina arrangement permits change of temperature of the heating film without interference with the electric circuit by varying the proportion of the heating film area which radiates to the outside. Normally temperature regulation of heaters is effected by thermostats featuring the temperature actuated mechanical movement of a bimetallic strip. This actuates an electric switch to effect changes in the electric supply. The folded patterns of the heating film of the invention and particularly the concertina arrangement described above permit temperature regulation by mechanical movement without electric switching, that is generally by opening or closing of the concertina between limits. This movement can be done directly by a (bimetallic) controller which transduces temperature changes (or desired temperature programs) into mechanical movement. "Directly" in this context refers to remaining in the realm of mechanical movement, not needing another transducer of the mechanical movement into an electric operation.

FIGURE 19 illustrates an example. Here the inside stiffeners 89 and the outside stiffeners 91 of the concertina 92 are linked to a series of links 93 which are pivoted to them and extend and are pivoted together to form a lazy-tongs linkage linked to a bimetallic strip 94. When the temperature of the bimetallic strip changes, its curvature changes and the link 95 is displaced up or down thus opening or closing the concertina through the lazy-tongs linkage. This figure shows stiffeners of comparatively wide section set with their narrow edges towards the fold lines of the concertina.

The wide variability of operating temperature with area with a concertina arrangement also permits the use of the concertina type in certain novel heater constructions provided by the present invention. Thus the structure may be used in a space heater which in the closed condition operates as a spot heater or as a medium temperature radiator, and works as a "low" temperature, large surface heater which is safe to touch when fully opened. A Venetian blind or a foldable screen is a preferred form of such a heater. Another use is in medical equipment where control of heater area and temperature is desirable. Further uses are as a process heater and as a film or appliance for conveniently controllable heating of food. It is naturally possible to extend the range of temperature and radiation which the concertina movement permits by adding the usual forms of current regulation which can be used for any heating film.

Concertina folding is of great utility also for use with high resistance foil patterns in high temperature heaters. Such high resistance alloy foils are usually obtainable only in small widths and as has been mentioned above narrow foils are cut in the $y$ direction when they have to cover a wider area. Cuts in the $x$ direction and concertina folding are very suitable for narrow patterns.

If the parallel meanders are separated at the bridges and connected in series of if the folds of the pattern are made in the $y$ direction so that the folding line traverses areas at different potentials, the metallic stiffeners, rods or plates need to be insulated by ceramic tubes, sleeves or coatings and preferably washers or bushes located at the slots in the bridges.

I claim:

1. A method of producing an electric heating fabric by forming a meander pattern of electrically conducting metal foil which includes the steps of making sequences of spaced cuts of substantial length each sequence extending in a line, the lines being substantially parallel and the bridges of uncut foil left between cuts being substantially opposite in alternate lines but being staggered with respect to those in adjacent lines, crimping the foil over substantially its whole area by folding it into a multiplicity of undulations of very small size in relation to the length of the cuts without substantially reducing the thickness of the foil itself, the direction of the crimping being such that the freedom afforded by the undulations to the foil to expand and contract in its own plane is in directions having a substantial component perpendicular to the lines of cuts, expanding the foil in its own plane in a direction having a substantial component perpendicular to the lines of cuts and within the freedom afforded by at least partial flattening of at least some of the undulations so as to cause the cuts to open into slots, and providing at least two terminal areas adapted to connect the pattern between points of different potential in an electric circuit.

2. A method as set forth in claim 1 including the further steps performed after the steps of making the sequence of cuts and crimping the foil and prior to expanding the foil in its own plane, comprising supporting the slotted and crimped foil on an insulating layer of a material capable of deformation by pressure, and then forcing a part of the insulating layer under pressure into the cuts in the foil thereby to effect the step of expanding the foil in its own plane, the forced-in material being left in the cuts.

3. A method as set forth in claim 1 including the further step of cutting away at least some of the bridges subsequently to the opening of the cuts.

4. A method as set forth in claim 1 also including the further steps performed after the cuts have been opened into slots, comprising bending the slotted foil progressively into a hollow substantially tubular formation with the two longitudinal edges of the foil close together and substantially parallel, winding a flexible insulating tape helically closely around the slotted foil with the edges of the tape closely adjacent, securing the foil and tape together into a laminated tube, severing said laminated tube by cutting along a line adjacent said two longitudinal edges of the foil, and then opening out the laminated tube into a band.

5. A method as set forth in claim 1 in which the expansion of the slotted foil to open the cuts comprise the step of continuously exerting a force on the foil in a direction substantially transverse to the direction of the lines of cuts and thereafter holding the foil expanded while laminating it to an insulating support.

6. A method as set forth in claim 1 in which the expansion of the slotted and crimped foil to open the cuts comprise the steps of feeding the slotted foil forward in a direction parallel to the lines of cuts, effecting a gradual transverse stretching of the slotted foil in its own plane while it continues to be fed forward thereby causing the arms constituted by the foil between the lines of cuts to diverge, and when the desired divergence is attained, redirecting the arms parallel to the feed direction.

7. A method as set forth in claim 1 in which the expansion of the slotted and crimped foil to open the cuts includes the step of at least partially flattening the undulations locally in the centre of the bridges of uncut foil.

8. A method as set forth in claim 1 in which after making the sequences of cuts and crimping the foil, the latter is indented by squeezing it sufficiently to reduce its thickness permanently over an array of small local areas within each said area of the foil in addition to the partial flattening of the undulations.

References Cited in the file of this patent

UNITED STATES PATENTS

| | | |
|---|---|---|
| 1,861,434 | Campbell | June 7, 1932 |
| 2,018,085 | Otte | Oct. 22, 1935 |
| 2,084,556 | Hamilton | Jan. 22, 1937 |
| 2,537,764 | Hunzicker et al. | Jan. 9, 1951 |
| 2,588,859 | Lumbard | Mar. 11, 1952 |
| 2,611,298 | Rowe | Sept. 23, 1952 |
| 2,692,019 | Zalkind | Oct. 19, 1954 |
| 2,737,571 | Eisler | Mar. 6, 1956 |

OTHER REFERENCES

Webster's New International Dictionary of the English Language, second edition, G. C. Merriam Co., Inc., publishers. 1938.